(12) United States Patent
Haugen

(10) Patent No.: US 6,953,141 B2
(45) Date of Patent: Oct. 11, 2005

(54) JOINING OF TUBULARS THROUGH THE USE OF EXPLOSIVES

(75) Inventor: David M. Haugen, League City, TX (US)

(73) Assignee: Weatherford/Lamb, Inc., Houston, TX (US)

( * ) Notice: Subject to any disclaimer, the term of this patent is extended or adjusted under 35 U.S.C. 154(b) by 0 days.

(21) Appl. No.: 10/280,213

(22) Filed: Oct. 25, 2002

(65) Prior Publication Data

US 2004/0079786 A1 Apr. 29, 2004

(51) Int. Cl.⁷ .............................................. B23K 20/08
(52) U.S. Cl. ...................... 228/2.5; 228/107; 228/108; 228/109; 166/379; 166/380
(58) Field of Search ............................. 228/107, 108, 228/109, 2.5; 166/299, 378, 379, 380

(56) References Cited

U.S. PATENT DOCUMENTS

| | | | |
|---|---|---|---|
| 3,263,323 A | | 8/1966 | Maher et al. |
| 3,720,069 A | * | 3/1973 | Lockridge .................... 405/166 |
| 3,893,222 A | * | 7/1975 | Ballinger ..................... 228/107 |
| 3,955,741 A | * | 5/1976 | Hofer .......................... 228/2.5 |
| 3,985,279 A | | 10/1976 | Wilson et al. ................ 228/109 |
| 3,987,952 A | | 10/1976 | Wittman et al. ............. 228/2.5 |
| 4,003,513 A | * | 1/1977 | Chadwick .................... 228/107 |
| 4,046,301 A | | 9/1977 | Wittman et al. ............ 228/108 |
| 4,062,570 A | * | 12/1977 | Wilson et al. ................ 285/22 |
| 4,160,464 A | * | 7/1979 | Ballinger ..................... 138/93 |
| 4,228,941 A | * | 10/1980 | Persson ....................... 228/107 |
| 4,248,373 A | * | 2/1981 | Linse et al. .................. 228/107 |
| 4,632,292 A | * | 12/1986 | Gnyra .......................... 228/107 |
| 4,641,775 A | | 2/1987 | Lande et al. |
| 4,662,450 A | * | 5/1987 | Haugen ....................... 166/299 |
| 4,669,649 A | | 6/1987 | Persson |
| 4,746,150 A | | 5/1988 | Persson et al. |
| 4,756,465 A | | 7/1988 | Pranch et al. ............... 228/115 |
| 4,981,250 A | | 1/1991 | Persson ....................... 228/107 |
| 6,533,040 B2 | * | 3/2003 | Gondouin .................... 166/380 |
| 2004/0045717 A1 | * | 3/2004 | Haugen et al. ............. 166/379 |

FOREIGN PATENT DOCUMENTS

| | | |
|---|---|---|
| GB | 1 220 171 | 1/1971 |
| GB | 1 437 944 | 6/1976 |

OTHER PUBLICATIONS

U.K. Official Preliminary Examination and Search Report, Application No. GB 0324842.4, dated Feb. 17, 2004.

* cited by examiner

*Primary Examiner*—Lynne R. Edmondson
(74) *Attorney, Agent, or Firm*—Moser, Patterson & Sheridan, L.L.P.

(57) ABSTRACT

Embodiments of the present invention generally relate to methods and apparatus of connecting wellbore tubulars by explosive welding, using a frangible anvil, and reforming a surface of wellbore tubulars at a connection. In one embodiment, a first tubular is aligned proximate a second tubular such that an inside diameter of the first tubular and an outside diameter of the second tubular form an annular space, a frangible anvil is disposed in a bore defined by the tubulars, and an explosive charge placed around the outside surface of the first tubular is detonated. In another embodiment, tubulars are aligned, connected by explosive welding, and then reformed at the connection.

30 Claims, 8 Drawing Sheets

JOINING OF TUBULARS THROUGH THE USE OF EXPLOSIVES

BACKGROUND OF THE INVENTION

1. Field of the Invention

Embodiments of the present invention generally relate to methods and apparatus of connecting wellbore tubulars by explosive welding. More specifically, the present invention relates to apparatus and methods for joining together the ends of wellbore tubulars by explosive welding and reforming a connection between the tubulars. More particularly still, the present invention relates to methods and apparatus of joining together the ends of wellbore tubulars by explosive welding while using a frangible anvil.

2. Description of the Related Art

In order to access hydrocarbons in subsurface formations, it is typically necessary to drill a borehole into the earth to some predetermined depth adjacent a hydrocarbon-bearing formation. The process of drilling a borehole and of subsequently completing the borehole in order to form a wellbore requires the use of various tubular strings. While the depth of a typical borehole reaches several thousand feet, the length of an individual tubular is only approximately thirty feet. Therefore, in the construction, completion, and production phases of oil or gas wells it is usually necessary to assemble long strings of tubulars that include drill pipe, casing, production tubing, and liner. Due to the length of these tubulars, sections or stands of tubulars are progressively added to the tubular string as it is lowered into the well from a drilling platform.

When it is desired to add a section or stand of tubular, a string of tubulars is usually restrained from falling into the well by applying the slips of a spider located in the floor of the drilling platform. The new section or stand of tubular is then moved from a rack to the well center above the spider and placed on top of the string using a top drive adapter. Next, the new tubular is connected to the tubular string and the entire tubular string lowered into the well by using an elevator to lift the tubular string slightly to enable the slips of the spider to be released prior to lowering the tubular string. Once the top of the new tubular is adjacent the spider, the slips of the spider are re-applied, the elevator is disconnected, and the process repeated until the joined tubulars form a tubular or casing string of desired length.

Each tubular is filled with fluid as it is run into the wellbore to maintain pressure in the wellbore and prevent collapsing due to high pressures within the wellbore. In order to circulate the drilling fluid, the top of the tubular string must be sealed so that the tubular string may be pressurized with drilling fluid. Since the tubulars are under pressure, the integrity of the seal is critical to safe operation and to minimize the loss of expensive drilling fluid. Once the tubulars are in position downhole, the mechanical and seal integrity of the jointed connections are critically important since any failures in connections become difficult and costly to fix.

As the tubulars are joined and lowered into the hole, the tubulars may become stuck. When this occurs, load or weight must be added to the tubular string to force the tubulars into the wellbore or drilling fluid must be circulated down the inside diameter of the tubular and out of the tubular into an annulus in order to free the tubular from the wellbore. Therefore, special rigging has traditionally been installed to axially load the tubular string or to circulate drilling fluid.

Typically threaded connections are used to connect multiple tubular members end-to-end. This is usually accomplished by providing tubulars that have a simple male to female threaded connection. These tubulars are connected, or "made-up," by transmitting torque against one of the tubulars while the other tubular is held stationary. Torque is transmitted in a single direction in accordance with the direction corresponding with connection make-up. Any torque applied to the joint in the make-up direction will have the effect of continuing to tighten the threaded joint. Tubular joints are susceptible to leaking and mechanical failures due to, among other things, over-torquing. Commonly used thread connections with internally and externally flush screw thread connections form weak spots with a significantly lower strength than the rest of the tubular. Further, connecting screw thread casing at the drilling floor consumes time and requires carefully machined tubulars.

Since there are problems associated with jointed tubulars, explosive welding techniques present an alternative for forming a connection between the tubulars. Explosive welding of pipes requires either locating an explosive charge internally in conjunction with an external supporting "anvil" and leading detonating wires out of the end of the tubular or utilizing an external explosive charge in conjunction with an internal anvil that is either subsequently withdrawn from the tubular or left in the inside diameter of the tubular. However, these approaches present feasibility problems with wellbore tubular make-up on a rig floor where machinery, space, and time are at a premium. Leading the detonating wires out of tubulars or removing the anvil from the inside diameter of the tubular requires both time and equipment. In addition, leaving an internal anvil within the inside diameter of a wellbore tubular creates a restriction that can impede fluid flow and can effect subsequent tool passage through the tubular. Therefore, it would be useful to be able to explosively weld wellbore tubulars together using a disposable interior anvil or integrate a removable anvil with other individual devices needed at the wellbore.

One drawback of the bonding or welding process for joining tubulars is that an inside diameter and an outside diameter of the tubular connection can become distorted. This distortion occurs due to the intense pressure or heat applied to the tubulars when joining them. Distortion of the inner diameter of the tubulars is problematic because it may minimize the production capacity of the well and cause tools and smaller tubulars to snag when lowered through the tubular. Similarly, distortion of the outer diameter may cause the tubular to snag when lowered through the wellbore.

Therefore, there exists a need for apparatus and methods to facilitate the joining of tubulars by explosive welding. There exists a further need for apparatus and methods for explosive welding of wellbore tubulars that uses an anvil that does not require retrieval. Further still, there exists a need for apparatus and methods for correcting the distortions created by the joining of tubulars by explosive welding.

SUMMARY OF THE INVENTION

Embodiments of the present invention generally relate to methods and apparatus of connecting wellbore tubulars by explosive welding, using a frangible anvil, and reforming a surface of wellbore tubulars at a connection. In one embodiment, a first tubular is aligned proximate a second tubular such that an inside diameter of the first tubular and an outside diameter of the second tubular form an annular space, a frangible anvil is disposed in a bore defined by the tubulars, and an explosive charge placed around the outside surface of the first tubular is detonated. In another embodiment, tubulars are aligned, connected by explosive welding, and then reformed at the connection.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION OF A PREFERRED EMBODIMENT

Figure 1:
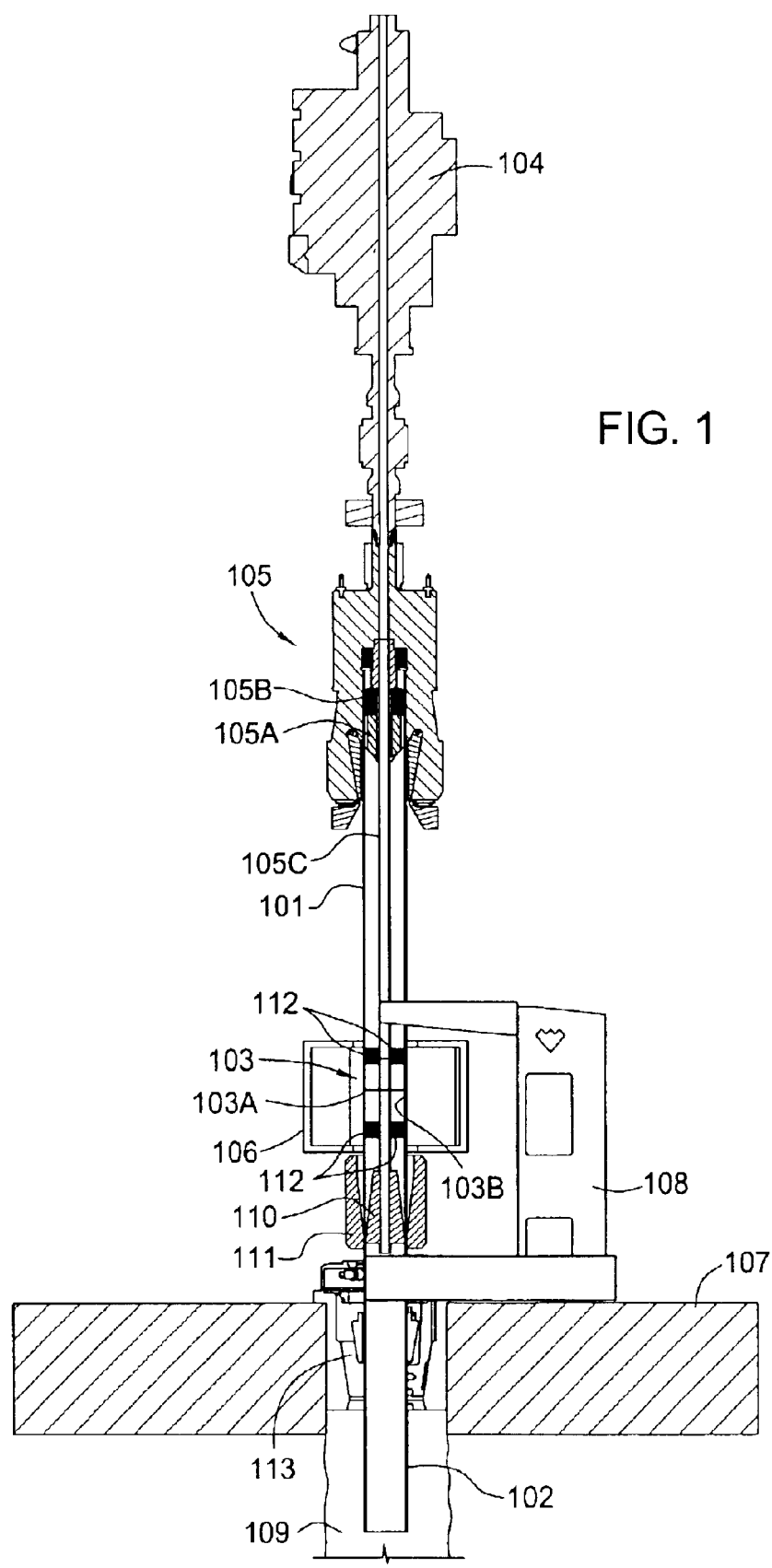
FIG. 1 is a cross-sectional view of a rig assembly for connecting tubulars.

FIG. 1 shows a cross-sectional view of a rig assembly used to connect one or more tubulars. As shown, a lower tubular 102 is suspended in a wellbore 109 using a spider 113 disposed in a rig floor 107. The spider 113 grips the lower tubular 102 and prevents the lower tubular 102 from falling into the wellbore 109 during the connection process. It must be noted that, as used herein, the lower tubular 102 may include a single tubular or a partial tubular string formed by one or more tubulars.

FIG. 1 also shows a top drive unit 104 suspended from a rig above and used to exert axial and rotational forces on the rest of the rig assembly, which may be a casing or drilling assembly. A top drive adapter 105 threadedly connects to a lower portion of the top drive unit 104. The top drive adapter 105 transfers forces exerted by the top drive unit 104 onto an upper tubular 101. The top drive adapter 105 grips a side portion of the upper tubular 101 and is an example of a tubular gripping member. However, other types of tubular gripping members are equally applicable in accordance with the aspects of the present invention. The top drive adapter 105 may include a fill-up tool 105B for dispensing and circulating fluid or cement. The top drive adapter 105 may also include an autoseal tool 105A. The autoseal tool 105A may be used to create a pressurized seal on the top of the upper tubular 101. The pressurized seal may be necessary to keep fluid in the hole and prevent tubular collapse.

An extension member 105C extends from the bottom of the fill-up tool 105B along the inside of the tubulars 101, 102. In FIG. 1, the extension member 105C extends past a tubular connection 103 into the lower tubular 102. This allows fluid to be pumped into the wellbore 109 without interfering with the tubular connection 103. Packers 112 attach to the extension member 105C and are movable therewith. The packers 112 are disposed above and below the tubular connection 103 to isolate an area around the tubular connection 103. The isolated area is filled with gas when the upper tubular 101 and the lower tubular 102 are bonded. Filling the area with an inert gas or a catalyzing agent may prevent corrosion or accelerate the bonding process. An inner diameter broach 110 is attached to a lower portion of the extension member 105C. The inner diameter broach 110 may be used to reform the tubular connection 103 after the upper tubular 101 and lower tubular 102 are joined.

FIG. 1 also shows a movable support frame 108 stationed above the rig floor 107. The support frame 108 may carry devices such as an explosion housing 106 to and from the wellbore 109. In an embodiment, the explosion housing 106 consists of two halves connected by a hinge along a vertical axis such that the explosion housing 106 can be closed around an area directly above and below the connection 103. In another embodiment, the explosion housing 106 can be a box shaped structure with openings at the top and bottom that permit insertion of the upper tubular 101 and the lower tubular 102. Therefore, the explosion housing 106 can be any shape or design that covers the connection 103 in order to safely contain the explosion when welding the upper tubular 101 and the lower tubular 102 by explosive welding. In addition to the explosion housing 106, the support frame 108 may also include an outer-diameter broach 111. The outer-diameter broach 111 may be used to reform the outer portions of the tubular connection 103 after connecting the upper tubular 101 and lower tubular 102. As shown in FIG. 1, the upper tubular 101 is aligned proximate the lower tubular 102, and the tubulars 101, 102 are ready to be connected by explosive welding.

Figure 2:
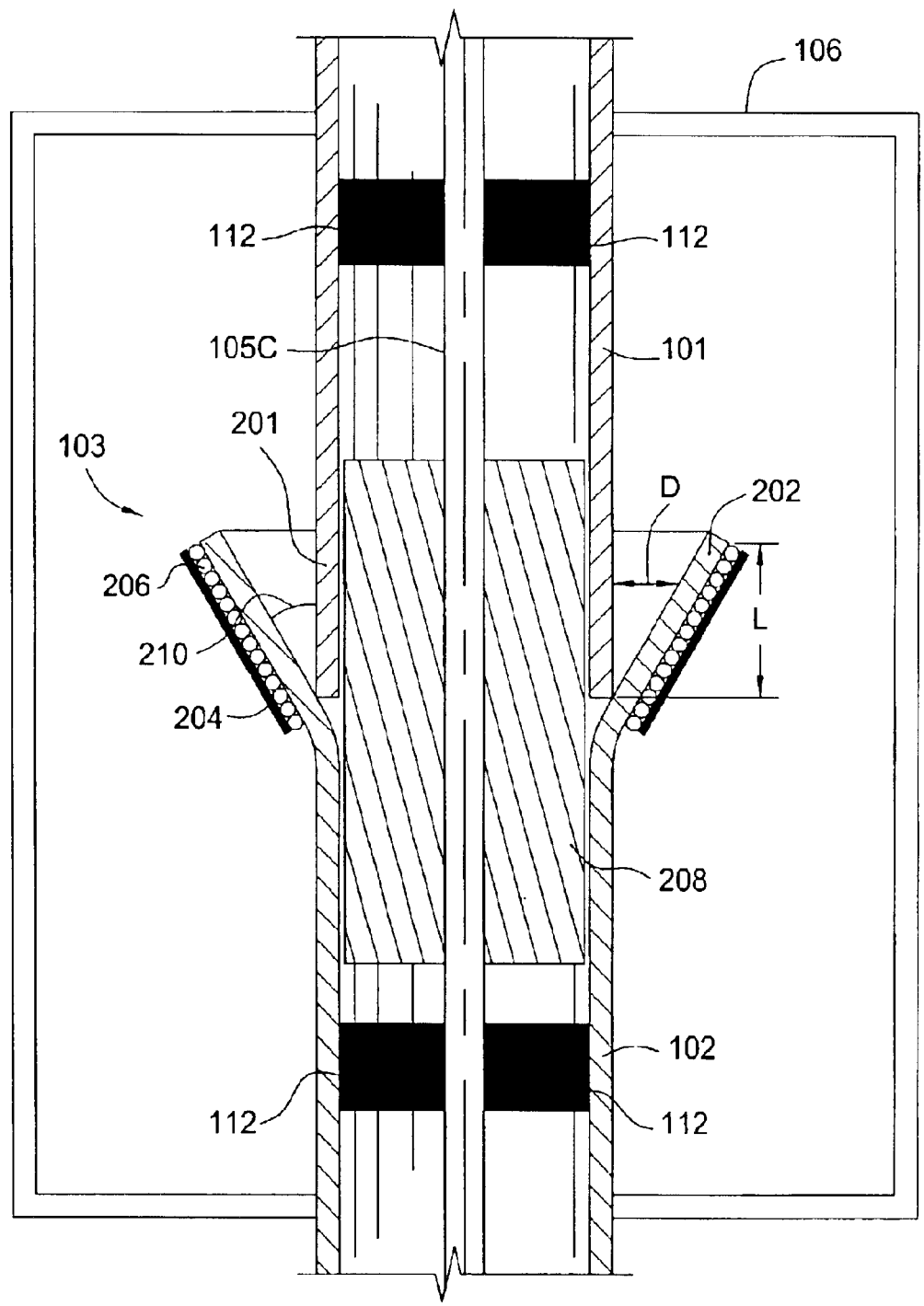
FIG. 2 is an enlarged sectional view of two tubulars ready for welding using the rig assembly in FIG. 1 showing both an explosive charge and an anvil in place.

FIG. 2 is an enlarged cross-sectional view of the tubular connection 103 that illustrates one embodiment for explosive welding; however, other known methods in the art utilizing explosive welding such as removable anvils and permanent mandrels can be used in combination with the methods and apparatus described herein. Visible in FIG. 2 is the upper tubular 101 stabbed into the lower tubular 102 as described in FIG. 1, vinyl tape 204 or other suitable material that holds an explosive 206 such as PETN cord circumferentially in contact with an outside surface of an end portion 202 of the lower tubular 102, and an anvil 208. The total amount and shape of the explosive 206 used depends upon wall thickness, diameter, alloy composition, and mechanical properties of the upper tubular 101 and the lower tubular 102. A detonator (not shown) initiates the explosive 206 at the tubular connection 103. It may be desirable to have the explosive 206 simultaneously detonated at a variety of points around the circumference of the end portion 202 of the tubular 102, such as having a detonator located at every two to four inches around the circumference of the end portion 202. The housing 106 contains and shields the explosion from the surrounding area on the rig.

As shown in FIG. 2, the end portion 202 of the lower tubular 102 has an inside diameter larger than an outside diameter of an end portion 201 of the upper tubular 101. Therefore, a distance D separates the outside diameter of the end portion 201 from the inside diameter of the end portion 202 in order to form an annular area between the end portions 201, 202 once the tubulars are stabbed together. It is along a length L of this annular area that explosive welding occurs and the connection 103 is made. As shown, the end portion 202 of the lower tubular 102 is flared outward and the end portion 201 of the upper tubular 101 is non-flared in order to form an angle 210. However, the angle 210 can be formed by any combination of flaring the end portions 201, 202 such as flaring the end portion 201 of the upper tubular 101 inward or by flaring the end portion 202 outward and the end portion 201 inward. Additionally, the angle 210 formed by the end portion 202 of the lower tubular 102 relative to the end portion 201 of the upper tubular 101 can be from between zero degrees to fifteen degrees. During the explosion of the explosive 206, the angle 210 becomes a dynamic angle that propagates along the length L of the connection 103. Since a dynamic angle of zero degrees causes impact between the end portions 201, 202 without forming a weld, this dynamic angle can be from five to twenty-five degrees, preferably from five to ten degrees, and most preferably eight degrees. The dynamic angle as it propagates along the length L of the connection 103 depends upon the distance D along the length L, the detonation velocity of the explosive 206 along the length L, and the thickness of the explosive 206 along the length L. Therefore, these properties must be selected in order to provide a dynamic angle capable of forming the weld at connection 103 given the properties of the metal comprising the end portions 201, 202.

The anvil 208 shown in FIG. 2 is preferably cylindrical in nature, having an outside diameter approaching that of the inside diameter of the upper tubular 101 and the lower tubular 102. Placing the anvil 208 in close proximity to the inside surface of the tubulars 101, 102 serves to prevent the tubulars 101, 102 from deforming inwardly due to the externally placed, yet inwardly focused, explosive 206. The desired length L of the weld determines the height of the anvil 208 since the height of the anvil 208 is at least that of the desired weld length L. The anvil 208 may contain a hollow core, as shown, or be solid depending upon detonation criteria. Nonetheless, the thickness and overall dimensions of the anvil 208 depend on the amount of explosive 206 used. Since the anvil 208 can be initially attached to the extension member 105C between the packers 112, the anvil 208 can be expandable, permanent, or frangible. The anvil 208 can be made frangible by providing an anvil 208 with a composition comprising a concrete or cement. Cement, concrete, and ceramics with similar mechanical properties provide high compression strength and low tensile strength. Therefore, these materials absorb compression from the detonation forces, yet crumble or break apart soon after detonation due to shock-waves and post-detonation tensile forces acting upon them.

Figure 3:
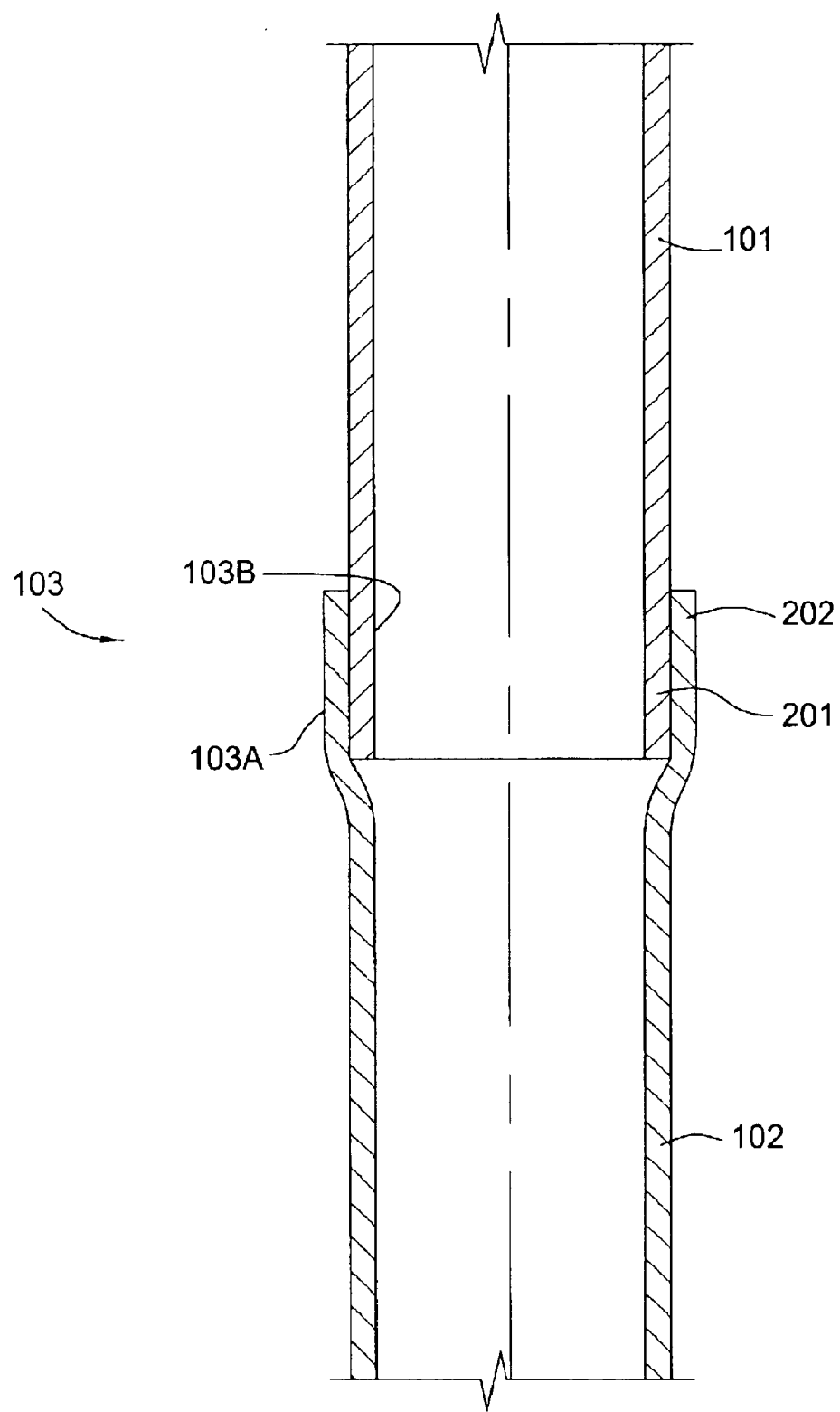
FIG. 3 is an enlarged sectional view of the two tubulars after connecting by explosive charge.

FIG. 3 depicts the tubular connection 103 after connecting the upper tubular 101 and the lower tubular 102 by explosive welding using an anvil that is frangible. The explosive housing, packers, and extension member visible in FIG. 2 have been omitted from FIG. 3 since explosive welding using the frangible anvil (not shown) can be used separately or in combination with the explosive housing, packers, and extension member. In FIG. 3, the anvil (not shown) has broken apart after detonation of the explosion and fallen down the wellbore. In other applications, the anvil (not shown) can be flushed from the tubulars' bore or trapped by the packers (shown in FIG. 2) upon breaking apart after detonation. As seen, the end portion 202 of the lower tubular 102 is welded to the end portion 201 of the upper tubular 101. Connecting the tubulars 101, 102 by explosive welding can distort an outside diameter 103A and/or an inside diameter 103B of the tubular connection 103. Therefore, the connection 103 can be lowered into the wellbore upon completion of the weld or the connection 103 can be reformed prior to lowering into the wellbore by using the methods and apparatus described herein.

Figure 4:
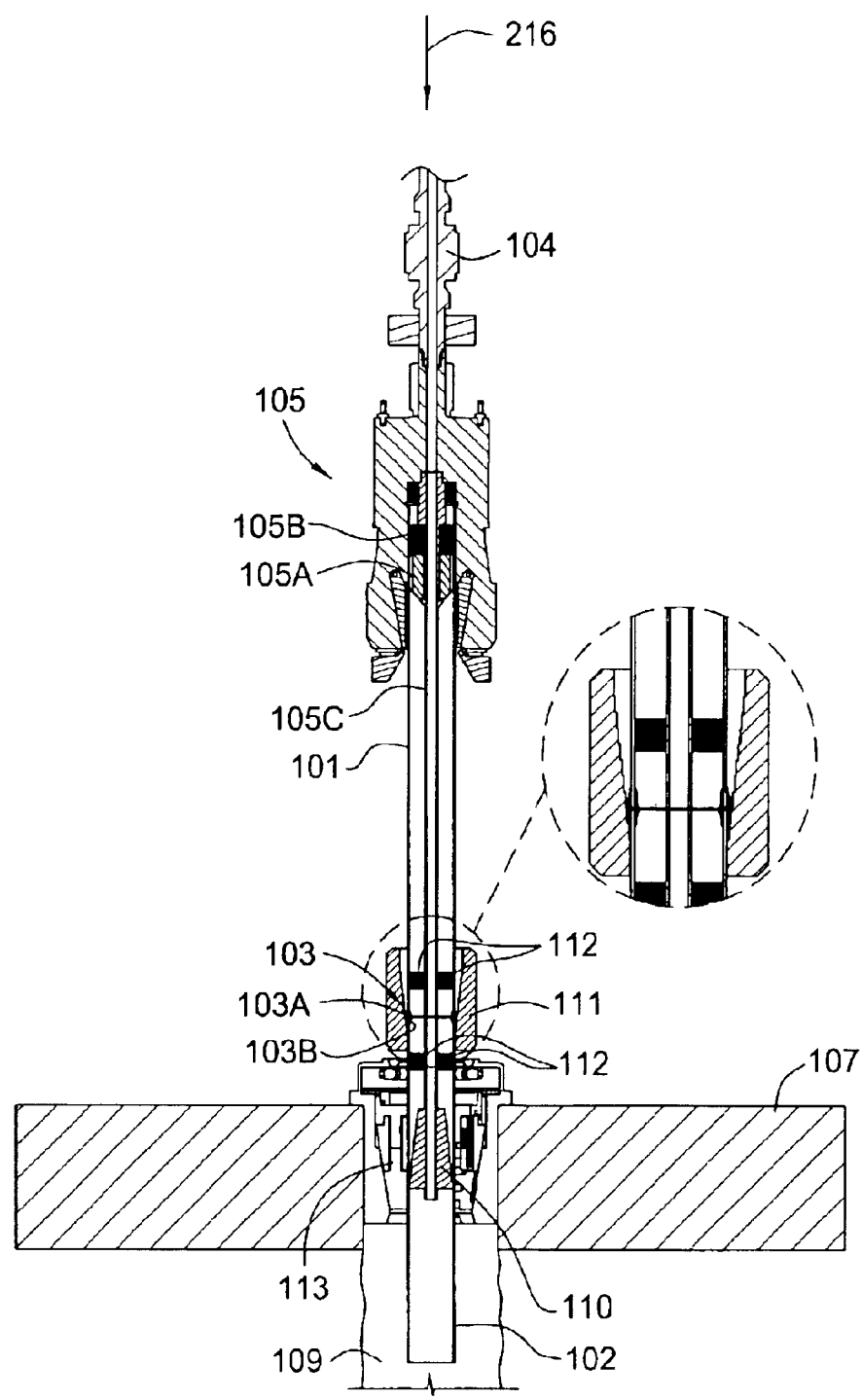
FIG. 4 is a cross-sectional view of the rig assembly while reforming an outside diameter of the tubulars.

FIG. 4 is a cross-sectional view of the rig assembly lowering the tubular connection 103 past the outer diameter broach 111. After the upper tubular 101 and the lower tubular 102 are joined, the explosion housing 106 (shown in FIG. 1) and the support frame 108 (shown in FIG. 1) are removed, but the outer-diameter broach 111 is left in place. Thereafter, the spider 113 is released and the top drive unit 104 supports the tubulars 101, 102 in the wellbore 109. The top drive adapter 105 grips the upper tubular 101 to ensure that the tubulars 101, 102 do not fall into the wellbore 109 as they are lowered. The arrow 216 of FIG. 4 indicates the lowering of the top drive unit 104 and the top drive adapter 105, which in turn lowers the tubulars 101, 102. As discussed below, the outer-diameter broach 111 is initially below the tubular connection 103 and designed to reform any external deformities created in the tubular connection 103 by the bonding process. As the tubulars 101, 102 are lowered, the outer diameter broach 111 passes over the tubular connection 103 and reforms the deformities in the outer diameter 103A. When the tubulars 101, 102 reach the desired position, the spider 113 grabs the upper tubular 101, which allows the top drive adapter 105 to release its grip on the upper tubular 101.

Figure 5:
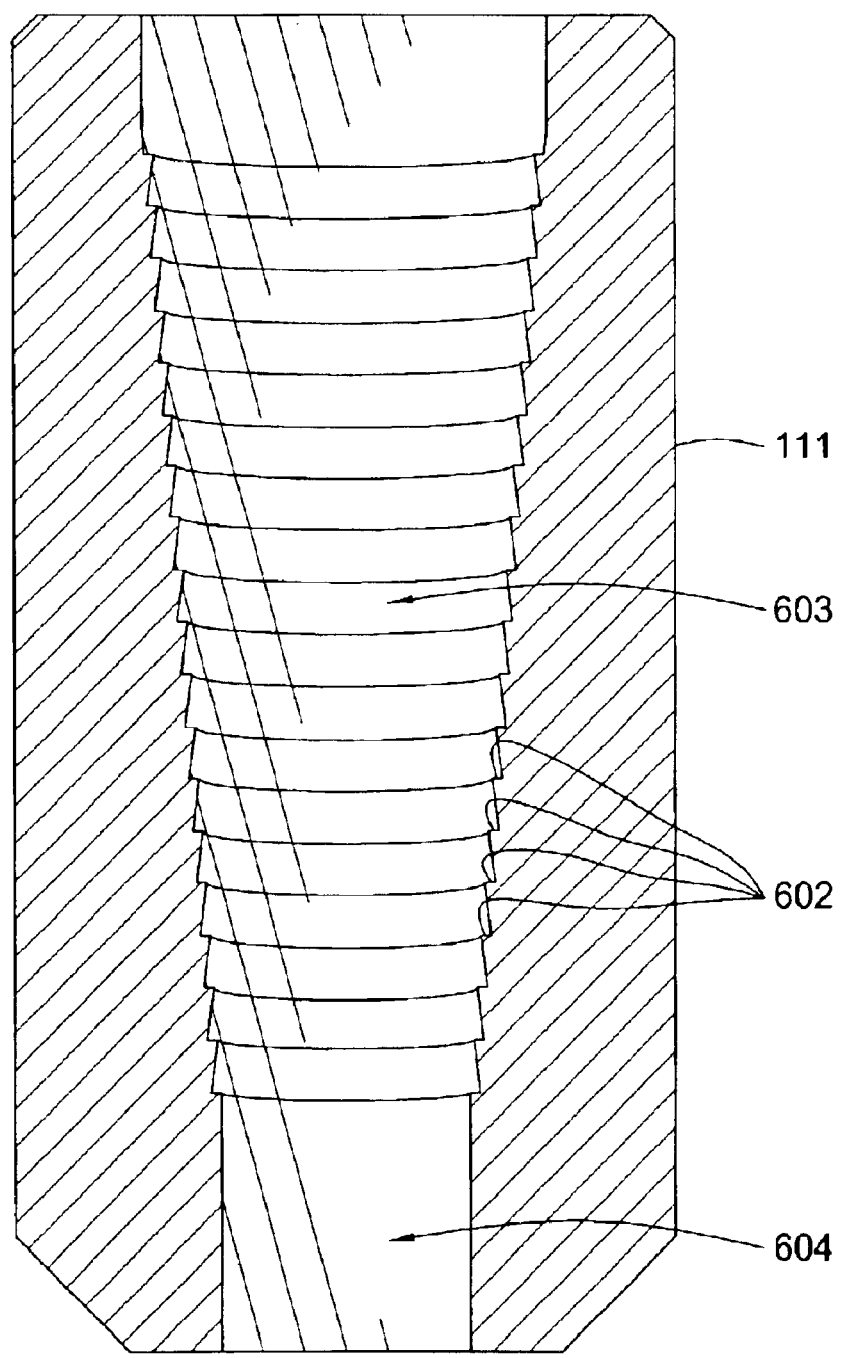
FIG. 5 is a cross-sectional view of a round broach for reforming an outside diameter of a tubular.

FIG. 5 is a cross sectional view of the round outer diameter broach 111 for reforming the outer diameter 103A of the connection 103 between tubulars 101, 102. FIG. 1 shows the outer diameter broach 111 in the larger tubular system. In one embodiment, an outer diameter broach 111 is an inverted and flipped version of the inner diameter broach 110. The outer diameter broach 111 is designed such that portions of the tubulars 101, 102 pass through the inner channel 603 of the outer diameter broach 111. The inner channel 603 has successive circular cutting edges 602 that narrow, with each successive edge from top to bottom. As the tubular connection 103 moves along through the outer diameter broach 111, as depicted in FIG. 4, each successive step cuts a small piece of the deformed tubular connection 103 until the connection 103 has been reformed to about the size of the lowest and smallest cutting edge. An aligning section 604 keeps the outer diameter broach 111 properly aligned with the tubulars 101, 102.

Figure 6:
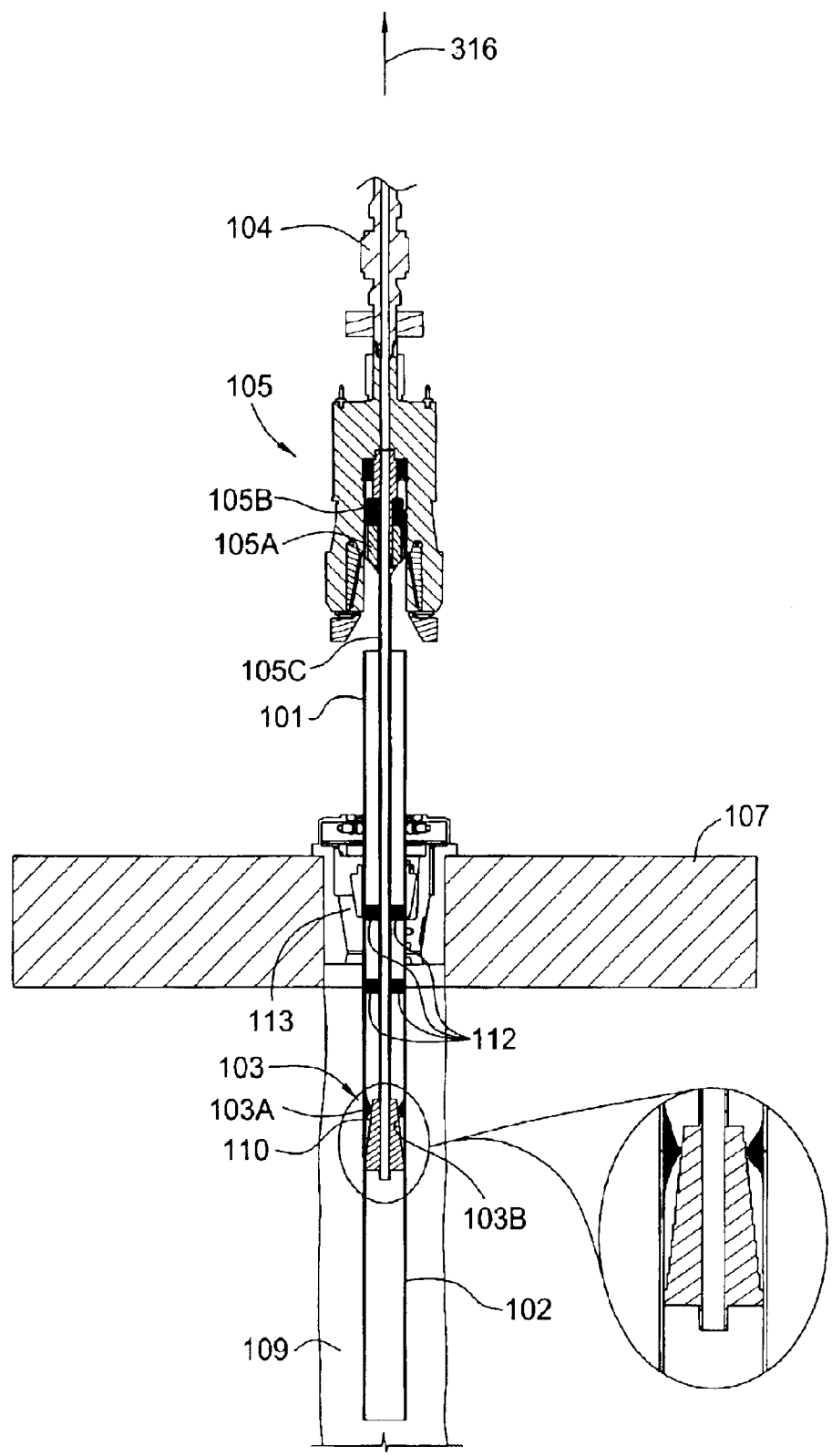
FIG. 6 is a cross-sectional view of the rig assembly while reforming an inside diameter of the tubulars.

FIG. 6 is a cross-sectional view of the rig assembly with the top drive unit 104 ready for removal. The arrow 316 of FIG. 6 indicates the raising of the top drive unit 104 and the top drive adapter 105, which in turn raises the inner diameter broach 110. The tubulars 101, 102 remain stationary while the inner diameter broach 110 moves axially past the tubular connection 103 and reforms the inner diameter 103B of tubular connection 103.

Figure 7:
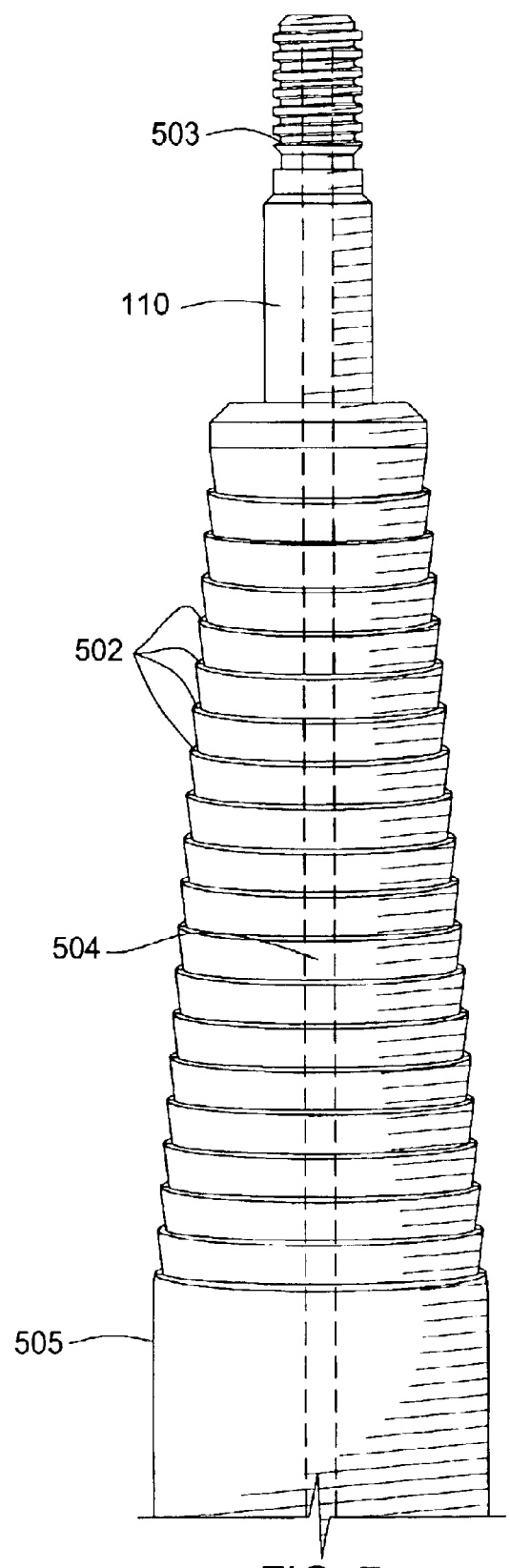
FIG. 7 is a cross-sectional view of a round broach for reforming an inside diameter of a tubular.

FIG. 7 is an exploded view of the round inner diameter broach 110 for reforming the inner diameter 103B of tubular connection 103 formed between the tubulars 101, 102 as shown in FIG. 6. The inner diameter broach 110, as discussed below, is but one example of a material reforming member. The inner diameter broach 110 is shaped like a cone with step-like cutting edges 502. The diameter of the cutting edges 502 increases from top to bottom. As the inner diameter broach 110 is pulled through the tubulars 101, 102, each of the cutting edges 502 produces a larger inside diameter at the tubular connection 103. Preferably the outer diameter of the last cutting edge is equal to the inner diameter of the tubulars 101, 102. However, because tubulars 101, 102 are not perfectly round, the broach 110 must be designed to accommodate irregularities in the inner diameter. One way of dealing with the irregularities is setting the outer diameter of the last cutting edge to a known diameter that is smaller than the ideal inner diameter of the tubulars 101, 102. The smaller known diameter, called a "drift diameter," is assured by using a "drift bar." The drift diameter is specifically defined by America Petroleum Institute specification #API5CT for casing and #API5D for drilling pipe. For example, before a tubular 101 is installed in the wellbore 109, a metal cylinder or "a drift bar," is forced through the tubular 101 to ensure the tubular 101 has a minimum inner diameter. If the drift bar does not fit through the tubular 101, the tubular 101 is considered irregular and will not be used. For example, a tubular with a 9-5/8 inch outer diameter might have an ideal inner diameter of 8.5 inches and a drift inner diameter of 8.4125 inches. To ensure a drift inner diameter of 8.4125 inches, a drift bar with an outer diameter of 8.4125 inches is forced through the tubular 101.

A lower portion of the broach 110 includes a control section 505 that keeps the broach 110 centered about the tubulars 101, 102 while reforming the connection 103. Preferably, the outer diameter of the control section 505 is about the same size as the drift inner diameter of the tubular 101. The broach 110 also contains a threaded shaft 503 for attaching to the rig assembly. The broach 110 may also contain a channel 504 for passing liquid or other objects through the broach 110. While the broach 110 is shown to have a single vertical channel 504, multiple channels may also be employed. Additionally, the broach 110 may include horizontal channels (not shown) that allow fluid from the vertical channel 504 to flow to the cutting edges 502 to remove material already cut and cool the tubular 101 as it is cut. Furthermore, the broach 110 allows the inner diameters of the tubulars 101, 102 to be reformed with one linear motion. This saves time because the linear motion used to reform the inner diameter is already required by the traditional method for joining tubulars 101, 102.

In addition to a broach 110, other types of material reforming members are applicable according to aspects of the present invention. For example, a drill like member may be use to remove material from the connection. A honing member may also be inserted and rotated to remove the distortion. A ridge reamer may also be used to remove the distortion. Furthermore, other methods of reshaping the distortion without removing material exist. For example, a cylindrical member, also known as a roller expander, which expands when rotated may reshape the distortion by flattening the distortion against the walls of the tubulars. Also a smooth cone shaped member may be pulled through the tubular to reshape the tubular connection.

Figure 8:
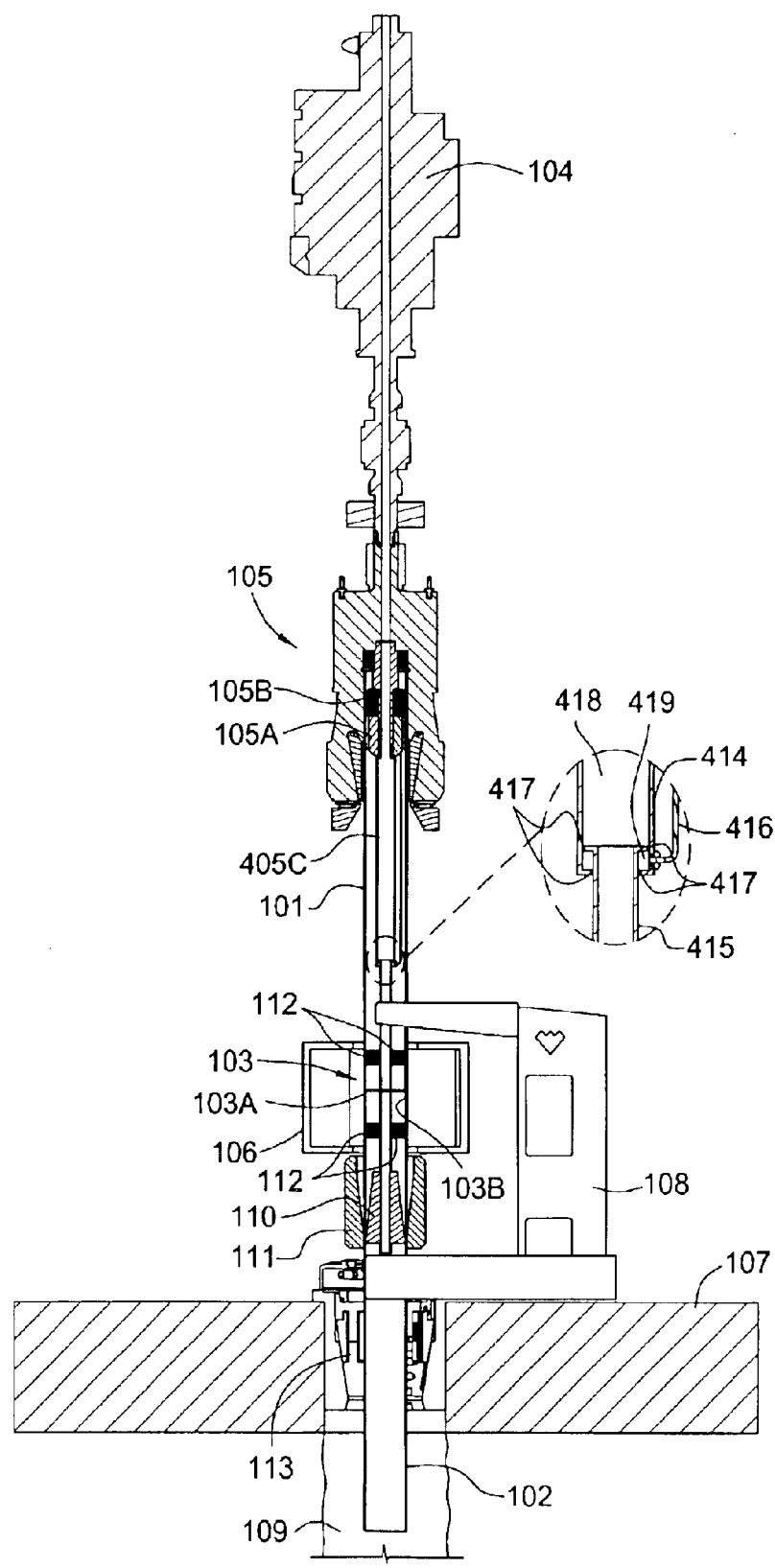
FIG. 8 is a cross-sectional view of a rig assembly with a material-reforming member according to another aspect of the present invention.

FIG. 8 is another embodiment of the present invention, incorporating a material-reforming member attached to a telescoping tubular 405C. The sequence for joining tubulars 101, 102 would be analogous to the method described above. The telescoping tubular 405C is capable of extending and retracting independently of other operations. The enlarged view in FIG. 8 shows an example of a telescoping tubular 405C with an inner channel 418 for passing fluid. The telescoping tubular 405C includes a piston 415 and cylinder 414 assembly operatively connected. The cylinder 414 may be fixed to the top drive adapter 105. The piston 415 is free to slide within the cylinder 414. A hydraulic line 416 is used to pump hydraulic fluid into a chamber 419 between the cylinder 414 and the piston 415. A seal 417 prevents the hydraulic fluid from leaking into the inner channel 418. As hydraulic fluid is pumped into the chamber 419, the piston 415 is forced up and the telescoping tubular 405C retracts. Conversely, pumping hydraulic fluid out of the chamber 419 will extend the tubular 405C.

One advantage of the telescoping tubular 405C is increased efficiency. Normally when the top drive adapter 105 is inserted into the upper tubular 101, the top drive unit 104 is raised until the entire extension member 405C is higher than the upper tubular 101. However, when the telescoping tubular 405C is retracted, the top drive unit 104 does not need to be raised as high for insertion and removal of the top drive adapter 105 because the extension member 405C may be retracted during insertion. Further, because the telescoping tubular may be retracted at anytime, the inner diameter broach 110 may reform the tubular connection inner diameter 103B anytime after the tubular connection 103 has been made. For example, the inner diameter broach 110 may reform the inner diameter 103B of the tubular connection 103 before inserting the tubulars 101, 102 into wellbore 109 or while inserting the tubulars into the wellbore 109. Preferably, the broach 110 reforms the inner diameter 103B of the tubular connection 103 while lowering the tubulars 101, 102 into the wellbore 109. The telescoping tubular 405C allows the top drive adapter 105 to retract the telescoping tubular 405C with increased force because it is pulling against itself as opposed to pulling against the weight of the tubulars 101, 102 and the grip of the spider 113.

While the foregoing is directed to embodiments of the present invention, other and further embodiments of the invention may be devised without departing from the basic scope thereof, and the scope thereof is determined by the claims that follow.

What is claimed is:

1. An apparatus for connecting two tubulars, comprising:
a frangible anvil member for placement adjacent an inside surface of the two tubulars, wherein the frangible anvil member comprises cement.

2. A method of connecting two tubulars, comprising:
placing an end portion of a first tubular into alignment and proximate an end portion of a second tubular, thereby defining an annular space between an inside diameter of the end portion of the first tubular and an outside diameter of the end portion of the second tubular;
disposing a frangible anvil into a bore defined by the first tubular and the second tubular;
placing an explosive charge around an outside surface of the first tubular;
isolating a chamber defined by an inside diameter of the first tubular and an inside diameter of the second tubular; and
detonating the explosive charge to connect the first tubular to the second tubular.

3. The method of claim 2, wherein the frangible anvil comprises cement.

4. The method of claim 2, wherein the frangible anvil comprises a material having compression strength greater than tensile strength.

5. The method of claim 2, wherein the detonating the explosive charge breaks apart the frangible anvil due to post-detonation stresses and shock-waves.

6. The method of claim 2, wherein the annular space defines a wedge shape.

7. The method of claim 2, wherein the annular space defines a wedge shape having an angle of four degrees.

8. The method of claim 2, wherein the detonating the explosive charge propagates a dynamic angle of between five degrees and ten degrees along a length of the annular space, the dynamic angle formed by the end portion of the first tubular and the end portion of the second tubular.

9. The method of claim 2, wherein the detonating the explosive charge propagates a dynamic angle of eight degrees along a length of the annular space, the dynamic angle formed by the end portion of the first tubular and the end portion of the second tubular.

10. The method of claim 2, further comprising flushing the bore to remove the frangible anvil.

11. A method for connecting a first tubular and a second tubular during a tubular running operation, comprising:

locating an end of the first tubular proximate an end of the second tubular;

positioning an anvil adjacent the end of the first tubular and the end of the second tubular;

detonating an explosive charge proximate the end of the first tubular and the end of the second tubular, thereby forming a connection between the first tubular and the second tubular; and lowering the first tubular and the second tubular in a wellbore after detonating the explosive charge.

12. The method of claim 11, further comprising circulating a fluid through the first tubular and the second tubular during detonating the explosive charge.

13. The method of claim 11, further comprising applying a pressurized seal in at least a portion of a bore defined by the first tubular and the second tubular.

14. The method of claim 11, further comprising isolating a chamber defined by an inside diameter of the first tubular and an inside diameter of the second tubular.

15. The method of claim 11, wherein the explosive charge is contained within a housing.

16. The method of claim 11, wherein the anvil is frangible.

17. The method of claim 11, wherein the anvil is removable.

18. The method of claim 11, further comprising reforming an inside diameter of the connection between the first tubular and the second tubular.

19. The method of claim 11, further comprising reforming an outside diameter of the connection between the first tubular and the second tubular.

20. The method of claim 11, further comprising:

reforming an outside diameter of the connection between the first tubular and the second tubular; and reforming an inside diameter of the connection between the first tubular and the second tubular.

21. The method of claim 2, further comprising circulating fluid through an isolated fluid path, the isolated fluid path passing through the chamber.

22. A method for connecting a first tubular and a second tubular during a wellbore tubular running operation, comprising:

locating an end of the first tubular proximate an end of the second tubular;

detonating an explosive charge proximate the end of the first tubular and the end of the second tubular, thereby forming a connection between the first tubular and the second tubular; and lowering the first tubular and the second tubular in a wellbore after detonating the explosive charge.

23. The method of claim 22, further comprising gripping the first tubular with a first gripping member and gripping the second tubular with a second gripping member.

24. The method of claim 22, further comprising circulating a fluid through the first tubular and the second tubular during detonating the explosive charge.

25. The method of claim 22, further comprising applying a pressurized seal in at least a portion of a bore defined by the first tubular and the second tubular.

26. The method of claim 22, further comprising isolating a chamber defined by an inside diameter of the first tubular and an inside diameter of the second tubular.

27. An apparatus for connecting two wellbore tubulars during a tubular running operation, comprising:

a rig floor;

a first tubular gripping member proximate the rig floor for gripping a first tubular;

a second tubular gripping member for gripping a second tubular;

an explosion housing for enclosing an outer portion of the first and second tubulars; and a frangible anvil for placement adjacent a surface of one of the tubulars and inside a bore of the tubulars.

28. The apparatus of claim 27, further comprising an inner reforming member for reforming an inside diameter of at least a portion of at least one of the wellbore tubulars.

29. The apparatus of claim 27, further comprising an outer reforming member for reforming an outside diameter of at least a portion of at least one of the wellbore tubulars.

30. The apparatus of claim 27, further comprising a conveying member operatively connected to the second tubular gripping member and at least partially insertable into an interior of the two wellbore tubulars, the frangible anvil operatively connected to the conveying member.

* * * * *